US009003429B2

(12) United States Patent
Luna (10) Patent No.: US 9,003,429 B2
(45) Date of Patent: Apr. 7, 2015

(54) SYSTEM AND METHOD OF ENABLING ADDITIONAL FUNCTIONS OR SERVICES OF DEVICE BY USE OF TRANSPARENT GATEWAY OR PROXY

(75) Inventor: Michael Luna, San Jose, CA (US)

(73) Assignee: AliphCom, San Francisco, CA (US)

( * ) Notice: Subject to any disclaimer, the term of this patent is extended or adjusted under 35 U.S.C. 154(b) by 445 days.

(21) Appl. No.: 12/886,919

(22) Filed: Sep. 21, 2010

(65) Prior Publication Data

US 2011/0214131 A1  Sep. 1, 2011

Related U.S. Application Data

(60) Provisional application No. 61/245,249, filed on Sep. 23, 2009.

(51) Int. Cl.
| | |
|---|---|
| G06F 3/00 | (2006.01) |
| H04L 29/08 | (2006.01) |
| G06F 9/54 | (2006.01) |
| H04M 1/60 | (2006.01) |
| H04M 1/725 | (2006.01) |

(52) U.S. Cl.
CPC ............. *H04L 69/32* (2013.01); *H04M 1/6066* (2013.01); *H04M 1/72522* (2013.01); *H04M 2250/02* (2013.01); *G06F 9/541* (2013.01)

(58) Field of Classification Search
None
See application file for complete search history.

(56) References Cited

U.S. PATENT DOCUMENTS

| | | | |
|---|---|---|---|
| 2002/0083212 A1* | 6/2002 | Salmon | 709/313 |
| 2004/0216147 A1 | 10/2004 | Yanosy et al. | |
| 2007/0099679 A1* | 5/2007 | Saarisalo | 455/574 |
| 2009/0067440 A1* | 3/2009 | Chadda et al. | 370/401 |
| 2009/0113444 A1 | 4/2009 | Hackborn et al. | |

OTHER PUBLICATIONS

International Search Report and Written Opinon mailed Nov. 12, 2010 in PCT Application No. PCT/US10/49796 filed Sep. 22, 2010.

* cited by examiner

*Primary Examiner* — H S Sough
*Assistant Examiner* — Carina Yun
(74) *Attorney, Agent, or Firm* — Kokka & Backus, PC (57) ABSTRACT

A system, apparatus, or method for enabling an application developer to access the events, data and functionality of a device, such as a mobile phone, without being limited by the API provided by the device manufacturer. In some embodiments, the present invention utilizes a transparent gateway as a proxy that is inserted into the device stack to enable an application developer to access features and functions of the device beyond those exposed by the manufacturer provided API. For example, the transparent gateway may be inserted into the wireless stack of a mobile phone, in between the Bluetooth stack and the device's API. The transparent gateway may be installed in the mobile phone via an over the air provisioning or another suitable method.

12 Claims, 6 Drawing Sheets

SYSTEM AND METHOD OF ENABLING ADDITIONAL FUNCTIONS OR SERVICES OF DEVICE BY USE OF TRANSPARENT GATEWAY OR PROXY

CROSS-REFERENCE TO RELATED APPLICATION

This application claims priority from and the benefit of provisional application No. 61/245,249, filed on Sep. 23, 2009, the full disclosure of which is incorporated herein by reference for all purposes.

BACKGROUND

Embodiments of the present invention are directed to systems, apparatuses, and methods for enabling the interoperability of devices, and more specifically, to a method of enabling the development of new services and features for a user by inserting a transparent gateway into the stack of a device. The transparent gateway acts as a proxy to provide an application programming interface (API) that enables the development of services, features, and applications that utilize the capabilities of the device, where such capabilities may include data, functions, operations, and processes that were not accessible to developers in the absence of the gateway. Embodiments of the present invention provide a means for other devices and applications to interact with the device containing the transparent gateway in ways that would not be possible in the absence of the gateway. This enables the development of services and applications that rely on access to the internal operations of the device containing the gateway but which would not be accessible in the absence of the gateway.

Application developers wishing to build an application that interfaces with an existing device through Bluetooth™, or another wireless data input/output protocol supplied by a wireless device manufacturer, are currently limited to the functionality of the API exposed by each device manufacturer. This means that a developer or other party desiring to provide a new application or service to users of a device such as a headset or mobile phone are limited by the internal data, operations, and device functionality made available to them by the manufacturer through the existing API.

However, at present, there is no standard API that is exposed to application developers to enable the development of services and functionality that interact with, or utilize, these wireless data protocols to exchange data between a device such as a mobile phone or wireless communications equipped media player and another device, such as a headset.

The API exposed to developers (and hence the access to the internal data and operations of a device) may vary from device to device, and even change between versions of the same device. This places limits on the types of services and features that can be provided by application developers, and may also cause previously implemented services or features to be rendered obsolete when an API is changed or even slightly modified. Further, the lack of a standard API places severe limits on, and may eliminate the possibility of cross platform interoperability between certain types of devices. This limits the freedom of users to choose the combination of devices and accessories that they prefer to utilize to obtain the services and features that they desire.

Another problem created by the present use of a fixed API by a device manufacturer arises from the need by a manufacturer to change or replace an API after a device is released. At present, the only way for a manufacture to do this is by a software and/or firmware update, or the release of a new version of the device. Even in this case, the API's are still specific to the manufacturer. There is still no common API or set of services that are exposed to a developer to enable the development of value-added services and functions for users of a device such as a wireless headset or cellular phone.

What is desired is a system, apparatus, or method for enabling application developers to provide added-value services and functions for a manufacturer's device without being limited to the device features and functions exposed by the API provided by the manufacturer. Embodiments of the present invention address this and other disadvantages of the present approach to application development using a manufacturer exposed API both individually and collectively.

SUMMARY

Embodiments of the present invention are directed to a system, apparatus, and method for enabling an application developer to access the features and functions of a device to provide value-added services and functions, without being limited by the API provided by the device manufacturer. In some embodiments, the invention utilizes a transparent gateway which is inserted into the stack of a device's operating software and functions as a proxy to enable an application developer to access events, data, and functional elements of the device.

In some embodiments of the present invention a transparent gateway is implemented as a software or firmware application that is inserted between the internal wireless stack and the existing API of a device. The internal wireless stack functions to process data or instructions received from a wireless communications network. Thus, the transparent gateway is positioned in the data flow between a network connection that receives data or instructions from an external source and an existing API for the device in which the gateway is inserted. This allows the gateway to have access to the incoming data or instructions prior to any filtering or limitations that may be imposed by the existing API. The transparent gateway executes a set of rules that determine which "events" (such as specific data or instructions) are to be passed to an extended API for use in implementing new services or functionality, either by the device in which the gateway is inserted or by a combination of devices which may include the device in which the gateway is inserted. The rule base for the gateway may be updated, revised, corrected, etc. by an over-the-air or wireline update process to enable new rules to be implemented, and as a result, to enable new or updated services and functionality to be made available to a user.

In one embodiment, the present invention is directed to a device having: a communication interface configured to receive an event from an external source; a first application program interface (API) in communication with the communication interface; a transparent gateway disposed between the communication interface and the first API; a second API in communication with the transparent gateway; and a rule base in communication with the transparent gateway, the rule base comprising a set of rules. The transparent gateway configured to: receive the event from the communication interface; process the event to determine whether the event satisfies a rule in the set of rules of the rule base; and if the event satisfies a rule in the set of rules, apply the rule to the event.

In another embodiment, the present invention is directed to a method of providing a service to a user of a device. The method comprises: receiving an event from an element of the device responsible for implementing a wireless protocol; processing the received event to determine if the event satisfies a rule in a rule base; and if the received event satisfies a rule in the rule base, providing the event to an existing API provided by the manufacturer of the device as well as an extensible API.

In yet another embodiment, the present invention is directed to a method that comprises: providing a transparent gateway in a device, the transparent gateway provided between a network stack of the device and a first API of the device, the network stack configured to receive an event from an external source; providing a second API in communication with the transparent gateway; and providing a rule base in communication with the transparent gateway, the rule base comprising a set of rules. The transparent gateway being configured to: receive the event from the network stack; process the event to determine whether the event satisfies a rule in the set of rules of the rule base; and if the event satisfies a rule in the set of rules, apply the rule to the event.

Other objects and advantages of the present invention will be apparent to one of ordinary skill in the art upon review of the detailed description of the present invention and the included figures.

DETAILED DESCRIPTION

In some embodiments, the present invention is directed to a system, apparatus, or method for enabling an application developer to access the events, data and functionality of a device, such as a mobile phone, without being limited by the existing APIs provided by the device manufacturer. In some embodiments, the present invention utilizes a transparent gateway as a proxy that is inserted into the device stack to enable an application developer to access features and functions of the device beyond those exposed by the manufacturer provided APIs. For example, the transparent gateway may be inserted into the wireless stack of a mobile phone, between the Bluetooth™ stack and the device's APIs. The transparent gateway may be installed in the mobile phone via an over the air provisioning, a direct wireline connection, or another suitable method. The rule base implemented by the gateway to determine which data or events to make available to an application may be updated, revised, or replaced by any suitable method, including over the air provisioning or a direct connection to a computing device.

Note that the device in which the transparent gateway/proxy is installed may be any suitable audio and/or data capable device. Such "base" devices may include, but are not limited to, mobile phones, music players, headsets, etc. The system, apparatuses and methods enable developers to access the functions and capabilities of the base device, where that device may communicate over a wireless network with a second device. The second device may be any suitable "secondary" device that is capable of communicating and/or exchanging data over a wireless network with the base device in which the transparent gateway/proxy is installed. The transparent gateway/proxy may be used to enable the development of an application or functionality that provides the base device with the ability to interact with the secondary device in ways that were previously unavailable. Thus, in some embodiments, a headset capable of wireless communication (e.g., a Bluetooth™ headset) may function as the base device with a different device serving as the secondary device, while in other embodiments, a mobile phone may function as a base device, with the headset functioning as a secondary device.

In the case of a mobile phone serving as the base device and a Bluetooth™ headset serving as the secondary device, by inserting a transparent gateway/proxy between the lowest layer of the wireless stack (e.g., between the Bluetooth™ or other network communications stack) and the device's existing APIs, it is possible to control or circumvent the events reported to the existing device APIs. In addition, a developer is enabled to create and access a set of extended, common functions that can be used to manipulate or control, or allow cross platform development for applications. The transparent gateway/proxy can be configured to expose an extensible API set that is common across all platforms regardless of the functions exposed by the device manufacturer. Note that this is an exemplary embodiment, and that placement of the transparent gateway/proxy in other base devices would be performed in a manner dependent upon the structure and arrangement of the base device stack and the type of secondary device that is being used as part of the system.

The transparent proxy/gateway can be inserted at the time of device manufacturing, or at a later time using an over the air or direct connection based provisioning technique. An application that is to be installed in the device may also be provided to a device over the air or using a direct connection. The transparent gateway/proxy may be used to expand or extend the APIs provided by a device manufacturer, while providing a set of common extensible APIs to application developers that is independent of hardware platform constraints or limitations established by the manufacturer. Further, the transparent gateway/proxy may be used to change or expand the capabilities of a device to enable support for new applications or functions by performing an over-the-air update of the transparent gateway's operating rules that define what events or data are exposed to applications, or what functions or operations are triggered by specific events or data.

In an exemplary situation, an incoming "event" or data is received by the base device (such as a cellular phone) and processed by the wireless stack. The event or data is passed by the transparent gateway/proxy to the device's internal API manager (i.e., the event or data is made available to the existing APIs exposed by the device manufacturer). The event or data is also examined in view of the rule base to determine if the event or data satisfies one or more rules, indicating that the event or data should be made available to the extended API manager so that the event or data can be utilized by an extensible API or function not previously made available by the manufacturer. Further, upon the receipt of a rule update process trigger or indicator (typically via an appropriate channel such as SMS, a control channel, or a data channel), a rule base update process may be initiated. The update process may involve an update manager element receiving and installing new or revised rules in the rule base, where such new or revised rules may operate to enable new functions, services, or features of the base device, or of an external device that is capable of communication with the base device.

In some embodiments, the present invention functions as an abstraction layer that can intercept, expose, or provide access to any API that can be presented by the wireless or network communications stack to enable the development of value added services. For example, any API making use of a network stack must receive and/or send commands to (in the form of function calls and/or data exchange with) the stack. Since the transparent gateway/proxy is between the API and the stack, such commands must go through the transparent gateway/proxy. In typical usage, the transparent gateway/proxy would merely allow the commands to pass unmodified, but the transparent gateway/proxy provides the capability to silently discard the command (hence intercept it), modify it (for example adding additional data), or expose it (for example, responding to a set of API calls that the network does not respond to and translating these into stack calls. For example, a transparent gateway/proxy might provide a logging utility not provided by the stack or the API by recording all commands to a suitable log file or transmitting a copy of them to a remote device. Embodiments of the present invention can also operate to create one or more new extensible APIs to enable customization of the set of data, functions, or features that are made available to developers. The extensible APIs that are created can be the same from device to device, or may vary among different devices (note that the structure and operation of the transparent gateway/proxy may also be device specific). The new extensible APIs can function to allow an application to access to events, functions, and data in ways that are not currently supported or exposed by a device. Further, the existing or newly created APIs can be extended in functionality or revised by using an over the air-update or other provisioning technique, where the update can be sent to all devices or only to a subset as needed.

The newly created extensible APIs may also allow or expose access to custom protocols that would not otherwise exist in the current device. Note that since the gateway/proxy is transparent, the existing APIs (i.e., those enabled by the device manufacturer) are still exposed without change to their current configuration and may be used by applications.

Note that it is possible to expose one or more APIs that can trigger changes in a secondary device (such as a Bluetooth™ connected headset) that is connected to the base device in which the transparent gateway/proxy is installed. Such changes may include operational mode changes, tuning, updates over the connected network using the base device as a modem/network proxy, etc. For example, an API might be exposed that enables the modification of network stack parameters, such as transmission mode (e.g. master or slave), transmission power, maximum transmission packet size and so forth, and as such parameters are negotiated between the base and secondary device as a consequence of their network connectivity, such changes on the base device lead to equivalent changes on the secondary device. Embodiments of the present invention can also enable functions that might be needed and which are specific to an application that is distributed to the device, such as mode changes, custom data/events that are utilized as part of the operation of the application, etc. For example, the transparent gateway/proxy might post events to an application that are not usually posted from a network stack, but reach an application message loop nevertheless because network events by default reach an application message, and such events might be events that are custom to an application, for example an application reset message.

As mentioned below in the description of the present invention, two devices are discussed. One is a secondary device that is external to the device in which the transparent gateway/proxy is installed. An example of a secondary device is a wireless device such as a Bluetooth™ headset (although as noted, such a device may also, in some circumstances, function as a base device). The other device is the base device in which the transparent gateway/proxy is installed. An example of a base device is a wireless device in the form of a wireless router or a mobile cellular phone.

Figure 1:
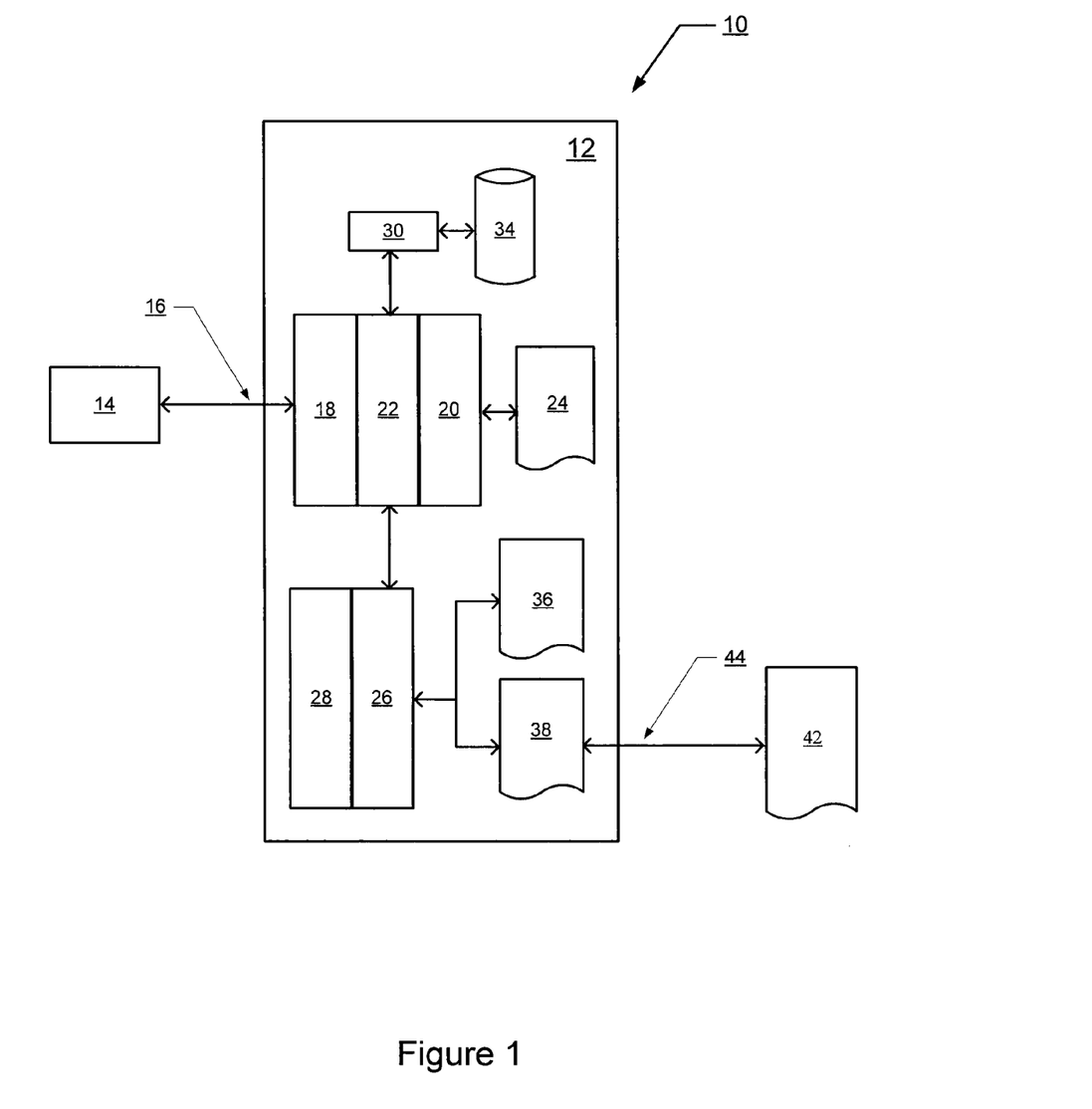
FIG. 1 is a functional block diagram illustrating certain components of a system that may be used to implement a transparent gateway, in accordance with some embodiments of the present invention.

FIG. 1 is a functional block diagram illustrating certain components of a system 10 that may be used to implement a transparent gateway/proxy and an extensible API in order to provide a user with access to new functions and capabilities, in accordance with some embodiments of the present invention. Note that not all of the depicted elements may be present in every system or device in which the transparent gateway/proxy and extensible APIs are used, and that the elements shown are depicted for purposes of example. As shown in the figure, the elements that may be present in an embodiment of the present invention may include a base device 12 and a secondary device 14. According to the illustrated embodiment, the base device is a mobile communications device, such as a mobile telephone, and the secondary device is an external wireless headset, such as a Bluetooth™ headset. However, it should be appreciated that the headset could be the base device and that the mobile communications device could be the secondary device.

A wireless network connection 16 is provided between the external wireless device 14 and the base device 12 for communicatively coupling the external wireless device 14, which is an external source, and the base device 12. The base device 12 includes a a communication interface, such as a network stack 18 exposed by the hardware in the base device 12. According to some embodiments, the network stack 18 is exposed by the manufacturer of the base device 12, which may be configured in a manner that limits access to certain desired functions, features, data, etc. The base device 12 further includes existing or first APIs 20 that are exposed by the manufacturer. A transparent gateway/proxy 22 inserted between the network stack 18 and the existing APIs 20, which are exposed by the manufacturer. The base device 12 further includes one or more existing or later installed applications 24 that rely on only the existing APIs 20. Extensible or second APIs 26 and a corresponding extensible API manager 28 are provided by the transparent gateway/proxy 22. According to some embodiments, the extensible API manager 28 resides in the transparent gateway/proxy 22 for providing and managing extensible APIs 26. Further, a rule base 34 is provided in communication with the transparent gateway/proxy 22. One or more sets of rules are provided in the rule base 34 to determine, for example, which incoming "events" or data are passed to the extensible APIs 26. Rule manager 30 is provided in communication with the rule base 34 for managing updates to the rules in the rule base 34.

In operation, the transparent gateway/proxy 22 has access to all events and data flow between the external wireless device 14 and the base device 12. For example, the transparent gateway/proxy 22 examines each incoming event or data against the one or more sets of rules in the rule base 34 to determine what, if any, action to take with regards to the examined event or data. For example, if the rules request that the event be exposed through the extensible APIs 26, then the transparent gateway/proxy 22 passes the event to the extensible API manager 28, which then passes the event to the appropriate one or more of the extensible APIs 26. It should be appreciated that this process is bi-directional, such that requests from the extensible API manager 28 are also examined and, if allowed by the rules of the rule base 34, communicated to the external wireless device 14.

One or more local applications 36 are installed on the base device 12 and make use of the extensible APIs 26 provided by the transparent gateway/proxy 22. The applications 36 may be installed by any suitable means, including over the air or via a direct connection to a personal computing device. Further, as illustrated in FIG. 1, parts of other applications 38 may also be installed on the base device 12. These applications 38 use the extensible APIs 26, but also have functionality distributed between the base device 12 and a backend service 42. In this case, a network connection 44 (wired or wireless based) is provided for passing data between the backend service 42 and the base device 12, such that the backend service 42 and the base device 12 can share the workload associated with executing the applications 38. The network connection may be, for example, the Internet or any other data/communications network.

According to some embodiments, the external wireless device 14 may be used to control one or more functions or operations of the base device 12 in which the transparent gateway/proxy 22 is installed. Further, according to some embodiments, the external wireless device 14 may be caused to execute an operation or function by an application, such as applications 36 and 38, that is installed in and executed by the base device 12. In either use case, embodiments of the present invention permit an application developer to access data, user interface elements, functions, receive event notifications, generate a response to an event, or interact with other operations of the base device 12 in ways that may not have been made available or exposed by the device manufacturer. This permits the development and implementation of additional functionality, user controls, or other features that add value for a user.

For example, embodiments of the present invention would allow implementation of extensible APIs 26 to expose noise levels, battery levels, or allow tuning of the base device 12. Another example would be to expose events that permit a user to use the external wireless device 14 to launch specific applications on the base device 12.

As an example, the present invention would allow implementation of extensible APIs 26 to expose events that permit a user to use the external wireless device 14 to launch an Internet search application on the base device 12 that enables a user to search the Internet for content via voice commands that the user inputs by speaking into the external wireless device 14. For example, the user could launch the Internet search application by speaking a launch command (such as "search" or "begin search") into the external wireless device 14 or by activating an appropriate button or other element of a user interface on the external wireless device 14. Once the Internet search application has been launched on the base device 12, the user could input search terms by speaking the search terms into external wireless device 14. After the user inputs the desired search terms, the user could speak a command that causes the Internet search application to execute a search using the inputted search terms. Further, the user could browse the search results using verbal commands (such as "next", or "more").

As noted above, the transparent gateway/proxy may be used to expand or extend the APIs provided by a device manufacturer, while providing a set of common extensible APIs to application developers that is independent of hardware platform constraints or limitations established by the manufacturer. Accordingly, an Internet search application is just one example of an application that may utilize the extensible APIs that are exposed by the inventive transparent gateway/proxy. It should be appreciated that developers may develop a virtually unlimited number of applications that could make use of the extensible APIs. These applications may, for example, be configured to be implemented on the base device 12 and controlled by a user via the external wireless device 14. Further, for example, these applications could be for purposes of entertainment and gaming, business and productivity, social networking, reference, news and weather, multimedia, finance, education, travel, etc.

Note that any application, including extended applications, may make use of the existing APIs 20 supplied by the manufacturer instead of or in addition to the extensible APIs 26, if desired. Also, it is possible to create an application that allows the external wireless device 14 to be updated with new applications, or to change the firmware of the external wireless device 14. Further, as noted, any new extensible API's 26 may be updated or revised by an over the air mechanism to allow new features and services to be modified or made available as needed.

Figure 2:
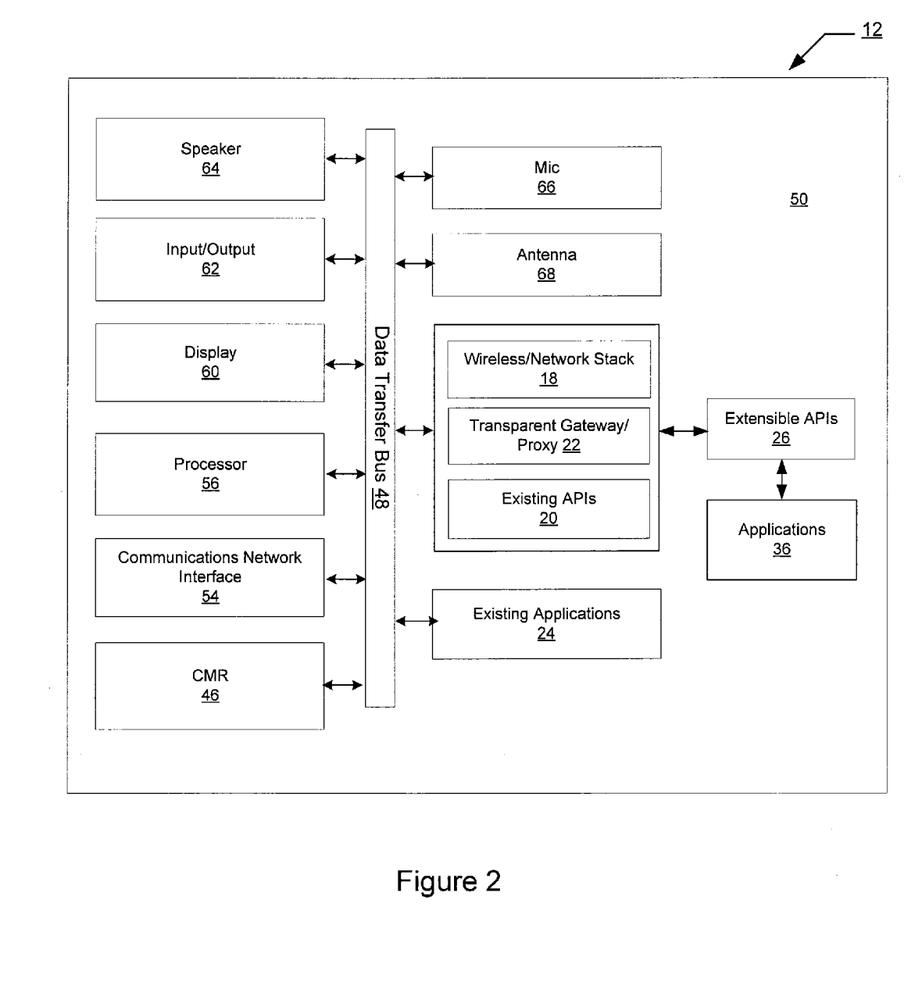
FIG. 2 shows an exemplary base device, in accordance with some embodiments of the present invention.

FIG. 2 shows a block diagram of an exemplary base device 12. The exemplary base device 12 is provided in the form of a mobile phone and may comprise a computer readable medium 46 and a body 50. The computer readable medium 46 may be present within the body 50, or may be detachable from it. The body 50 may be in the form a plastic substrate, housing, or other structure. The computer readable medium 46 may be a memory, such as a tangible (i.e. physical or durable) memory that stores data and may be in any suitable form including a hard drive, magnetic stripe, a memory chip, uniquely derived keys (such as those described above), encryption algorithms, etc.

The base device 12 may further include a communications network interface 54 capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the base device 12 and the secondary device 14. Thus, the base device 12 is capable of communicating and transferring data and/or control instructions via both cellular network and near field communications capability.

The base device 12 may also include a processor 56 (e.g., a microprocessor or a group of processors working together) for processing the functions of the base device 12 and a display 60 to allow a user to see phone numbers and other information, messages, and user interfaces generated by applications. The base device 12 may further include input/output elements 62 to allow a user to input or output information into and out of the base device 12, a speaker 64 to allow the user to hear voice communication, music, etc., and a microphone 66 to allow the user to transmit her voice through the base device 12. The base device 12 may also include an antenna 68 for wireless data transfer (e.g., data transmission).

As described above, the base device 12 further includes the network stack 18, the existing APIs 20 that are exposed by the manufacturer, and the transparent gateway/proxy 22 inserted between the network stack 18 and the existing APIs 20. The base device 12 further includes the existing or later installed applications 24 that rely on only the existing APIs 20. According to the embodiment illustrated in FIG. 2, the previously described extensible API manager 28 and rule base 34 reside in the transparent gateway/proxy 22 and are therefore not shown. The applications 36 are illustrated in FIG. 2 as being installed on the base device 12 and making use of the extensible APIs 26 provided by the transparent gateway/proxy 26. The applications 36 may be installed by any suitable means, including over the air or via a direct connection to a personal computing device. According to the illustrated embodiment, a data transfer bus 48 is provided for communicatively coupling the components of the base device 12.

Figure 3:
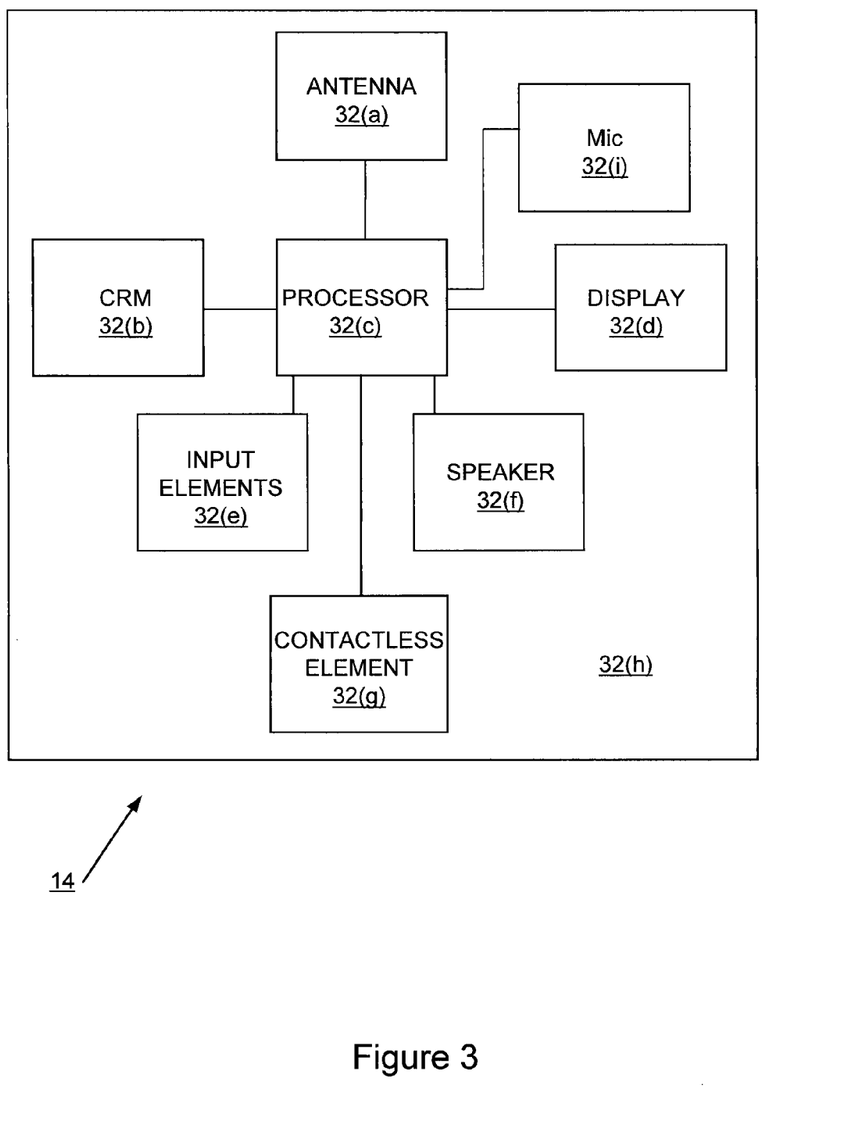
FIG. 3 shows an exemplary secondary device, in accordance with some embodiments of the present invention.

FIG. 3 shows block diagram of the exemplary external wireless device 14. The exemplary external wireless device 14 is provided in the form of a headset and may comprise a computer readable medium and a body. The computer readable medium 32(b) may be present within the body 32(h), or may be detachable from it. The body 32(h) may be in the form a plastic substrate, housing, or other structure. The computer readable medium 32(b) may be a memory, such as a tangible (i.e. physical or durable) memory that stores data and may be in any suitable form including a hard drive, magnetic stripe, a memory chip, uniquely derived keys (such as those described above), encryption algorithms, etc.

The external wireless device 14 may further include a contactless element 32(g) capable of transferring and receiving data using a near field communications ("NFC") capability (or near field communications medium) typically in accordance with a standardized protocol or data transfer mechanism (e.g., ISO 14443/NFC). Near field communications capability is a short-range communications capability, such as RFID, Bluetooth™, infra-red, or other data transfer capability that can be used to exchange data between the base device 12. Thus, the external wireless device 14 is capable of communicating and transferring data and/or control instructions via both cellular network and near field communications capability.

The external wireless device 14 may also include a processor 32(c) (e.g., a microprocessor or a group of processors working together) for processing the functions of the external wireless device 14. Further, according to some embodiments, the external wireless device may include a display 32(d) to allow a user to see phone numbers and other information and messages. The external wireless device 14 may also include input elements 32(e) to allow a user to input information into the device, a speaker 32(f) to allow the user to hear voice communication, music, etc., and a microphone 32(i) to allow the user to transmit her voice through the external wireless device 14. The external wireless device 14 may also include an antenna 32(a) for wireless data transfer (e.g., data transmission).

Figure 4:
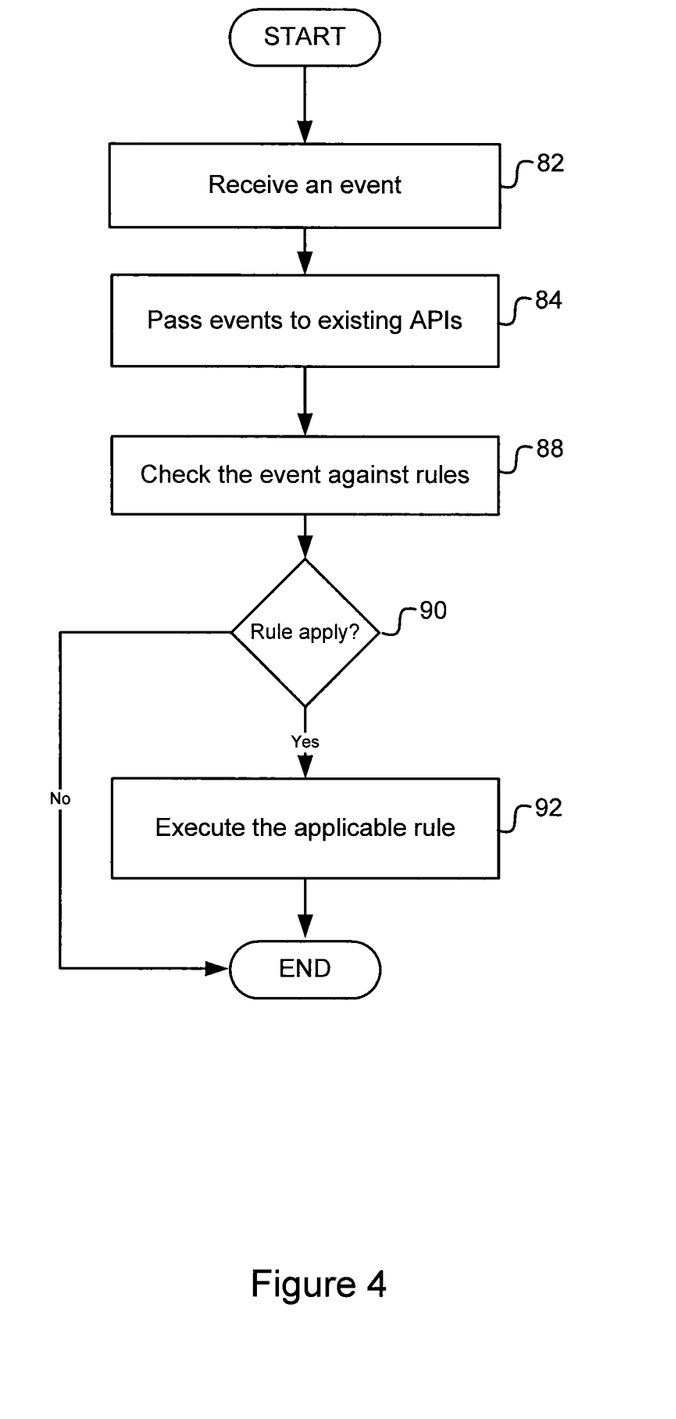
FIG. 4 is a flowchart illustrating example steps involved in operation of a transparent gateway/proxy, in accordance with some embodiments of the present invention.

FIG. 4 is a flowchart illustrating an exemplary operation of the transparent gateway/proxy 22 that is inserted into a network stack 18 of a base device 12 to enable access to the data and functionality of the base device 12, in accordance with some embodiments of the present invention.

As indicated at step 82 the transparent gateway/proxy 22 receives an event. Then, as indicated at step 84, the transparent gateway/proxy 22 transfers the event transparently to the existing APIs 20, which are exposed by the manufacturer of the base device 12. Next, as indicated at step 88, the transparent gateway/proxy 22 examines the event based on a set of rules, which are provided in the rule base 34, to determine whether one or more rules apply to the event. As indicated at box 90, if a rule does not apply, the transparent gateway/proxy 22 takes no action beyond sending the event to the existing APIs 20. However, as indicated at box 92, if one or more rules do apply, the transparent gateway/proxy 22 executes the rules. For example, the applicable rule or rules may specify that the transparent gateway/proxy 22 pass the event to the extensible APIs 26, which are exposed by the transparent gateway/proxy 22.

It should be appreciated that an event may be incoming or outgoing. For example, an incoming event or data may be generated by an external source, such as the secondary device 14, and provided to the transparent gateway/proxy 22 via the network stack 18. Also, for example, an outgoing event or data may be generated by the base device 12 internally, such as by one or more of the applications 24 or the extensible applications 36, and provided to the transparent gateway/proxy 22, which accesses the rule base 34 to determine whether, for example, to pass the event to the external secondary device 14. An event, for example, may trigger any type of action specified by the set of rules in the rule base 34 and supported by the external secondary device 14, including triggering an update process, interaction with an application that may reside on the external secondary device 14, installation of an application on the external secondary device 14, or tuning parameters or switching modes to enable feature enhancement on the external secondary device 14.

In an exemplary implementation, the transparent gateway/proxy 22 sits at the protocol level in the base device 12 and can be installed either over the air or by another suitable means. For example, the transparent gateway/proxy 22 may be installed at the time of firmware download. Further, the transparent gateway/proxy 22 may be provided statically linked to the network stack 18 (registered to receive events via a callback), and the existing APIs 20 may be statically linked to the transparent gateway/proxy 22 instead of, as in a normal configuration, the network stack 18. In this instance, the transparent gateway/proxy 22 would provide the same function calls (e.g. registration interface) as the network stack 18. Thus, the transparent gateway/proxy 22 is invisible to the existing APIs 20.

An example implementation of the transparent gateway/proxy 22 will now be provided with reference to FIG. 4, which provides a schematic representation of an exemplary headset 14 communicating with an exemplary mobile telephone 12 during the mobile phone's receipt of a telephone call. In this example, occasional reference is made to the components illustrated in FIGS. 1 and 2. It will be understood that the exemplary headset 14 is a Bluetooth™ headset comprising an application 70, an hands-free profile (HFP) stack 72, and a host communication interface (HCI) stack 74. For example, the application may be installed on the CMR of 32(b) and executed by the processor 32(c), and the HFP and HCI stacks 72, 74 may be part of the contactless element 32(g).

Further, it will be understood that the exemplary mobile telephone 12 includes an application 76, an HFP stack 78, and a HCI stack 80. It should be appreciated that the application 76 may be one of the existing applications 24 illustrated in the embodiments of FIGS. 1 and 2. Further, it should be appreciated that the HFP and HCI stacks 78, 80 may be part of the network stack 18 of the embodiments of the base device 12 illustrated in FIGS. 1 and 2.

According to the illustrated example, the application 70 is a call control application that allows the user to use the headset 14 to initiate and terminate calls, answer and reject incoming calls, and so forth. The application 70 of the headset 14 communicates with the HFP stack 72, which manages an actual call by, for example, answering and rejecting the call by communicating with the lower-level HCI stack 72, which may be a Bluetooth™ stack. The HCI stack 72, according to this example, controls data sent to the mobile telephone 12.

It will be understood that, according to an embodiment, one or more of the existing APIs 20 might be exposed by the manufacturer with a function such as "AnswerCall" to enable the application 70 of the headset 14 to answer a call. It will also be understood that in response to the application 70 calling such an "AnswerCall" function, the HFP stack 72 of the connected headset 14 may generate the HFP command that corresponds to the "AnswerCall" function. It will be further understood that the HCI stack 74 will then generate a binary HCI command sufficient to instruct the network stack 18 to send binary data corresponding to the "AnswerCall" command over the air to the mobile telephone 12.

Upon receiving the binary data from the network stack 18, the mobile phone 12 will parse the binary data to determine that it is an HFP command. Then, the mobile phone 12 will parse the payload of the binary command to determine that the binary command is the AT command ATA, and this in turn will cause the call to be answered.

A typical existing API 20 exposes a number of functions similar to "AnswerCall". For example, an existing API 20 may expose "TerminateCall", "PutCallonHold", and "Dial" functions. The existing API 20 has the advantage that it is straightforward for programmers to use. However, as discussed above, such existing API 20 has a number of disadvantages, including the lack of flexibility, poor upgradeability and poor standardization.

Consider now, by contrast, operation of the mobile phone having the transparent gateway/proxy 22 placed just above the HCI stack 80. According to an embodiment, the transparent gateway/proxy 22 functions to: receive events and data from the HCI stack 80, transmit data and events received from the HCI stack 80 up to higher levels of the stack; receive data and events transmitted to the HCI stack 80 from higher stack levels; match data and events being transmitted between the HCI stack 80 and the higher stack levels against some suitable rule base, such as rule base 34; transmit additional data to the HCI stack or higher stack levels; and modify data and events transmitted between the HCI stack 80 and higher stack levels.

According to this example, it will be seen that the transparent gateway/proxy 22 may receive data and events from the HCI stack 80, including the binary data corresponding to the "AnswerCall" (or the equivalent "ATA") function. It will also be seen from this example that the transparent gateway/proxy 22 may receive data and events corresponding to functions that do not have an API exposure, or may send data and events that have functions for which no API is exposed. For example, the API might not expose a function "PutCurrentCallonHold" but, since there exists a valid stack-level binary command equivalent to such action, the transparent gateway/proxy 22 could send this binary command and thereby cause the current call to be placed on hold.

Figure 6:
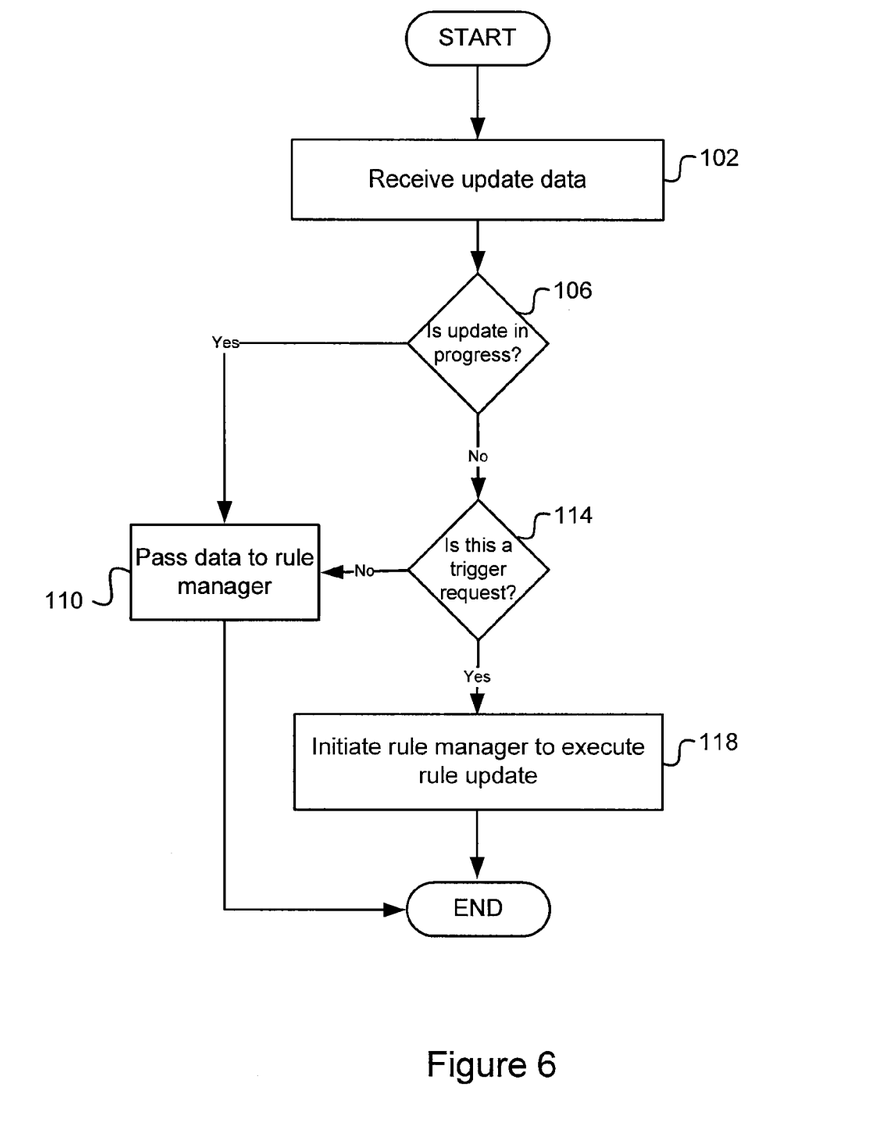
FIG. 6 is a flowchart illustrating example steps involved in updating a rule base, in accordance with some embodiments of the present invention.

FIG. 6 is a flowchart illustrating example steps involved in updating a rule base, in accordance with some embodiments of the present invention. Among other functions, the rules of the rule base 34 determine which incoming events are exposed to which API (e.g., the existing API and/or the extensible API), API manager, or associated function or operation of the base device 12. The extensible APIs 26 that are exposed through functions of the transparent gateway/proxy 22 may be updated from time to time to permit new events to be handled, or to permit previously experienced events to be handled in a different manner (i.e., in accordance with a new or updated set of rules). As indicated at box 102 of FIG. 6, the process of updating or revising the rules in the rule base 34 can be initiated by receiving update data. For example, the update data may be sent to the network stack 18 of the base device 12 and, upon receipt of the update data, the network stack 18 determines whether the rule manager is currently executing an update, as indicated at box 106. If an update is in progress, the network stack 18 passes the update data to the rule manager 30, as indicated at step 110. However, if an update is not currently in progress, the wireless stack 18, as indicated at step 114, determines whether the update data is a trigger request. If the update data is a trigger request, then, as indicated at box 118, the wireless stack 18 initiates the rule manager 30 to execute a rule update, else the wireless stack 18 passes the update data to the rule manager.

Consider for example a case where a programmer wishes merely to record a log of certain actions remotely, to aid in debugging or profiling or for other application-specific purposes. In this instance, the programmer may send the rule manager 30 a request to update the rules in the rule base 34 to include a rule to record a log of the certain actions.

Referring again to FIG. 5, consider the receipt of update data by the HCI stack 80 of the mobile telephone 12. The HCI stack 80 passes this update data to the transparent gateway/proxy 22. The transparent gateway/proxy 22 inspect this update data, for example, by examining the data header to determine the class of event, and possibly an event identifier.

Figure 5:
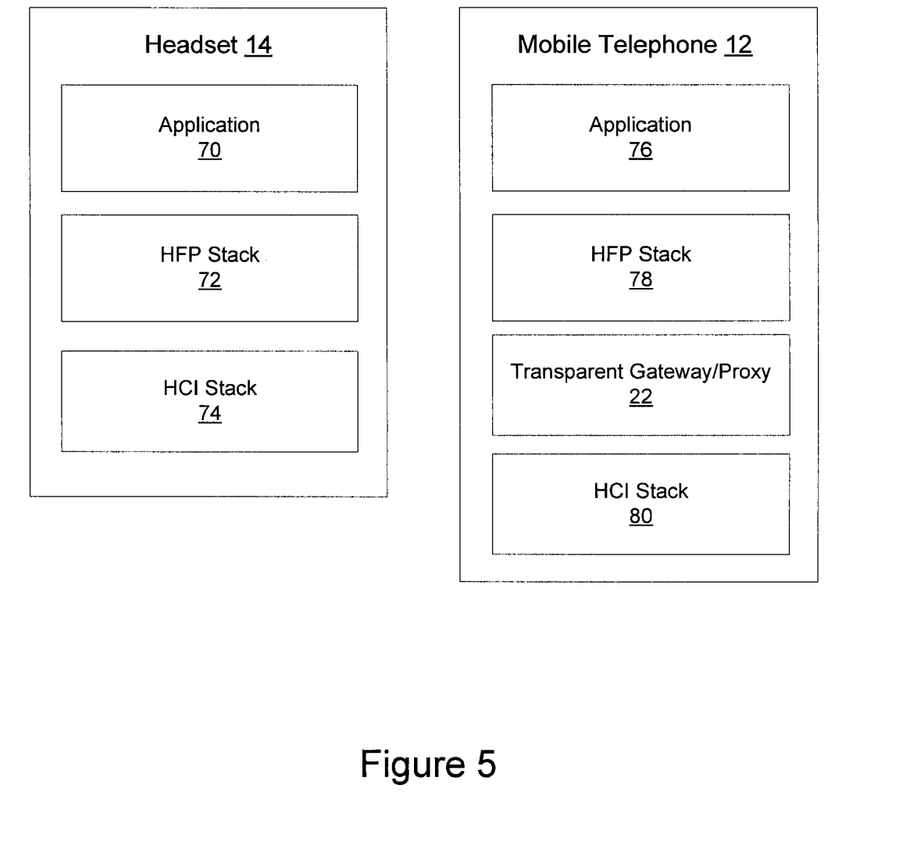
FIG. 5 shows features of an exemplary base device and an exemplary secondary device, according to an embodiment of the invention.

According to this example, the transparent gateway/proxy 22 stores a rule database, for example, as a list of event identifiers that should be logged. The incoming event may be matched against each of the identifiers in the memory list, and if the event identifier matches one of the identifiers in the list, the event may be logged, by copying it to a file, or sending the data over the air to a secondary device for display or storage.

It will be understood that a list in memory can easily be extended, by allocating more memory in which to store additional list items. The list may be updated through a function which adds an identifier to the list.

It will be understood that a wide range of rules can be stored: for example an identifier mask that matches a range of events, together with function or subsequent events that should be called or posted in the event that an application or network stack event matching the identifier mask.

In some embodiments, when the network stack 18 identifies a trigger event, it will start the process to update the transparent gateway/proxy 22 or rule base 34 over the air or through a suitable type of data connection, which may include a direct connection such as to a personal computer. An example trigger event might be the connection of a certain type of connection, or a connection from a certain hardware address. It will be understood that such information will typically be provided by the network stack 18, for example as a connection-received event that may be parsed to determine the type of connection (e.g. SPP) or peer hardware address.

As an example of an update process, consider the case where the update is pre-programmed to happen via an SPP connection from a known hardware address. The transparent gateway/proxy 22 may monitor network stack 18 connections events until it detects a connection from the known hardware address. It may then interpret all the data received over that connection as a refresh of the rule database 34, in which case it might dealllocate memory for the existing rules, allocate new memory and copy the rule data from the connection data stream to the newly allocated memory. Once complete, it may use this memory as a rule set, for example a set of identifier masks and function calls to make when network stack messages match on of the identifier mask.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

While certain exemplary embodiments have been described in detail and shown in the accompanying drawings, it is to be understood that such embodiments are merely illustrative of and not intended to be restrictive of the broad invention, and that this invention is not to be limited to the specific arrangements and constructions shown and described, since various other modifications may occur to those with ordinary skill in the art.

As used herein, the use of "a", "an" or "the" is intended to mean "at least one", unless specifically indicated to the contrary.

What is claimed is:

1. A device, comprising:
   a data transfer bus, and electrically coupled with the data transfer bus:
     an antenna;
     a processor;
     a wireless network stack electrically coupled with the antenna through the data transfer bus;
     a communication interface configured to receive an event from an external wireless source, the event wirelessly received by the wireless network stack and communicated to the communications interface through the data transfer bus;
     a first application program interface;
     a transparent gateway disposed between and in communication with the wireless network stack and the first application program interface;
     a first extensible application program interface in communication with the first application program interface;
     a second application program interface in communication with an extensible application program interface manager and the transparent gateway;
     a local application program interface in communication with the second application program interface;
     a third application program interface in communication with the second application program interface and with an external backend service via a network connection, the third application program interface including functions distributed between the external backend service and the second application program interface; and
   a rule base including a set of rules, the rule base in communication with a rule manager configured to update rules in the rule base, the rule manager in communication with the transparent gateway,
   the transparent gateway configured to: receive the event from the communication interface; process, using the processor, the event to determine whether the event satisfies a rule in the set of rules of the rule base, and if the event satisfies the rule in the set of rules, apply the rule to the event,
   the transparent gateway configured to: examine an incoming event received via the communications interface against one or more rules in the rule base, and pass the incoming event to the extensible application program interface manager when the one or more rules request the incoming event be exposed to the second application program interface.

2. The device of claim 1, wherein the rule instructs the transparent gateway to pass the event to the second application program interface.

3. The device of claim 1, wherein the rule instructs the transparent gateway to pass the event to the first application program interface.

4. The device of claim 1, wherein the rule instructs the transparent gateway to modify the event and then pass the event to at least one of the first application program interface and second application program interface.

5. The device of claim 1, wherein the rule triggers at least one of an update process, an interaction with an application residing on the external wireless source, an installation of an application on the external wireless source, and a tuning operation that enhances features on the external wireless source.

6. The device of claim 1, wherein the transparent gateway comprises an application program interface manager.

7. The device of claim 1, wherein the transparent gateway is configured to process, using the processor, the event to determine whether the event satisfies a rule in the set of rules of the rule base and, if the event satisfies a rule of the set of rules, pass the event to the external wireless source.

8. The device of claim 1, wherein the local application program interface makes use of the second application program interface and causes the external wireless source to control one or more functions or operations of the device.

9. The device of claim 1, wherein the local application program interface makes use of the second application program interface and enables control one or more functions or operations of the external wireless source.

10. The device of claim 1, wherein the external wireless source is a wireless headset.

11. The device of claim 1, wherein the communication interface is the wireless network stack and is configured to transmit and receive data using near field communications.

12. The device of claim 1, wherein the first application program interface is provided by a manufacturer of the device.

* * * * *